United States Patent [19]

Takase

[11] Patent Number: 5,396,943
[45] Date of Patent: Mar. 14, 1995

[54] PNEUMATIC TIRES FOR TWO-WHEELED VEHICLES

[75] Inventor: Kiyoshi Takase, Kodaira, Japan

[73] Assignee: Bridgesteon Corporation, Tokyo, Japan

[21] Appl. No.: 842,621

[22] Filed: Feb. 27, 1992

[30] Foreign Application Priority Data

Mar. 5, 1991 [JP] Japan .................. 3-078728

[51] Int. Cl.⁶ .................................. B60C 9/18
[52] U.S. Cl. ................... 152/531; 152/533; 152/534
[58] Field of Search ............ 152/526, 531, 533, 534, 152/454; 156/117

[56] References Cited

U.S. PATENT DOCUMENTS

| | | |
|---|---|---|
| 4,824,501 | 4/1989 | Ushikubo et al. |
| 5,032,198 | 7/1991 | Kojima et al. ............ 156/117 |
| 5,209,794 | 5/1993 | Nakasaki ............ 152/531 X |

FOREIGN PATENT DOCUMENTS

| | | |
|---|---|---|
| 0319588 | 6/1989 | European Pat. Off. |
| 2079429 | 11/1971 | France . |
| 2285255 | 4/1976 | France . |
| 2354874 | 1/1978 | France . |
| 2433411 | 3/1980 | France . |
| 219103 | 11/1985 | Japan .................. 152/532 |
| 74205 | 3/1991 | Japan .................. 152/531 |
| 1906294 | 2/1969 | Netherlands . |
| 628060 | 8/1949 | United Kingdom .......... 152/534 |
| 2157239 | 10/1985 | United Kingdom .......... 152/531 |

*Primary Examiner*—Geoffrey L. Knable
*Attorney, Agent, or Firm*—Sughrue, Mion, Zinn, Macpeak & Seas

[57] ABSTRACT

A pneumatic tire for a two-wheeled vehicle, which includes a carcass having opposite end portions turned up axially outwardly around a pair of bead cores spaced apart from each other in the direction of the tire-rotating axis, a tread and a pair of sidewalls reinforced by the carcass, and a belt consisting of at least one belt layer arranged between the tread and the carcass, said carcass consisting of at least one carcass ply of organic fiber cords arranged at a constant angle of 75° to 90° relative to the tire equatorial plane. At least one belt layer is made of organic fiber cords arranged substantially in parallel with the tire equatorial plane, and after vulcanization an average tension of the cords of said at least one belt layer at the central portion of the tread at an elongation upon the respective cords being more than 10% is higher than that of the cords of the belt layer at the side edge portion of the tread at substantially the same elongation upon the respective cords.

9 Claims, 2 Drawing Sheets

FIG_1
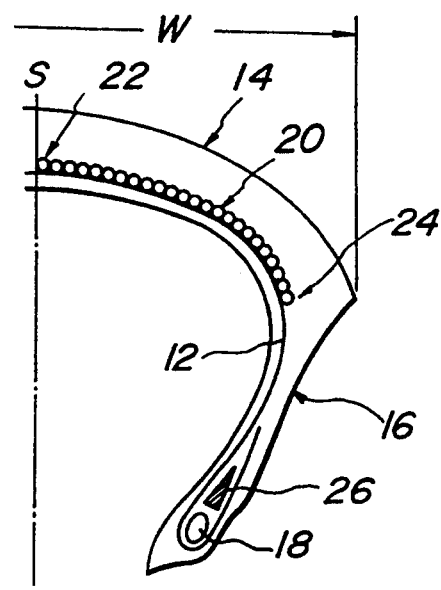
FIG_2
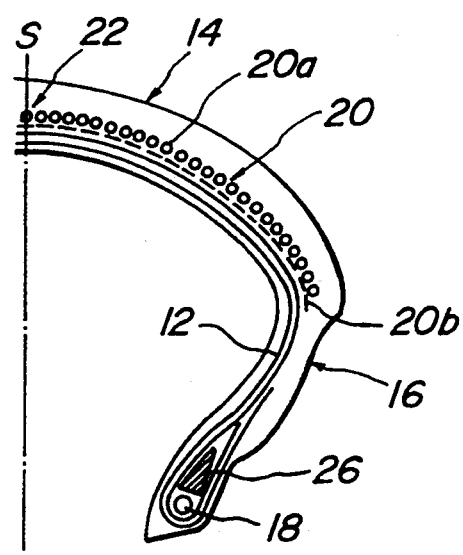

FIG_3
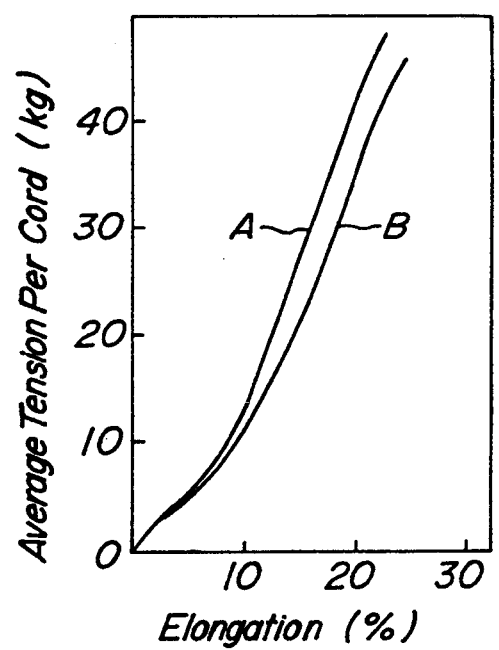

PNEUMATIC TIRES FOR TWO-WHEELED VEHICLES

BACKGROUND OF THE INVENTION

(1) Field of the Invention

The present invention relates to a pneumatic tire for a two-wheeled vehicle, which is improved in its motion characteristics on running at high speeds by suitably setting rigidity of the tire in the circumferential direction at the central portion and side edge portions of the tread of the tire.

(2) Related Art Statement

With the recent development of expressway networks and improvement of vehicle performance, various pneumatic radial tires for two-wheeled vehicles have been proposed. The pneumatic radial tire of this kind includes a carcass composed of at least one carcass ply of organic fiber cords arranged at a constant angle of 75° to 90° relative to the tire equatorial plane, and a belt arranged between the carcass and the tread rubber and composed of at least one belt layer of cords uniformly arranged at small angles relative to the tire equatorial plane. With such a tire, the belt tightens the carcass in the circumferential direction to restrain the movement of the tread. Therefore, it is known that the tire of this kind produces less heat, and exhibits high wear-resistance, high gripping performance, and excellent performances at high speeds.

Moreover, another pneumatic radial tire for a two-wheeled vehicle has been recently proposed, wherein a belt is composed of a belt layer of organic fiber cords spirally wound substantially parallel to the tire equatorial plane. By so doing, the bending rigidity of the tread is increased in the tire circumferential direction to restrain radially outward swelling of the tread and to improve the straight running performance at high speeds with the tire weight being reduced. As the organic fiber cords, aromatic polyamide fibers or the like having a high modulus of elasticity of not less than 600 kg/mm$^2$ are generally used in consideration of the radially outward swelling of the tread, particularly at its central portion.

In the tire having the organic fiber cords spirally wound and having the high modulus of elasticity, however, the bending rigidity of the tread in the circumferential direction is increased at its central portion owing to the arrangement of the organic fiber cords so that the bending rigidity of the tread at the side edge portions including sidewalls is also increased. On the other hand, the tire for the two-wheeled vehicle is inclined relative to a road surface when the vehicle is turned at a corner. Therefore, the tire for the two-wheeled vehicle is susceptible to external disturbances due to projections and depressions and differences in level on the road, so that running stability is deteriorated. This problem becomes particularly conspicuous in the case of tires having aspect ratios decreased for high performance tendency. Moreover, the organic fiber cords having high moduli of elasticity, such as aromatic polyamide fiber cords, are more expensive in comparison with the organic fiber cords having low moduli of elasticity, such as nylon 6 or nylon 66. Accordingly, the tire of the prior art involves an economical problem yet to be solved.

SUMMARY OF THE INVENTION

It is an object of the invention to provide a pneumatic tire for a two-wheeled vehicle, which eliminates the above disadvantages of the prior art and which has rigidity of the tread suitably distributed in the tire circumferential direction without deteriorating the advantages of the tire having organic fiber cords arranged substantially in parallel with the tire equatorial plane, thereby maintaining performance at high speeds and improving tire motion performances such as the riding comfortability, handling performance, turning performance, and the like.

In order to accomplish this object, the present invention relates to a pneumatic tire for a two-wheeled vehicle, which includes a carcass having opposite end portions turned up axially outwardly around a pair of bead cores spaced apart from each other in the direction of the tire-rotating axis, a tread and a pair of sidewalls reinforced by the carcass, and a belt consisting of at least one belt layer arranged between the tread and the carcass, said carcass consisting of at least one carcass ply composed of organic fiber cords arranged at a constant angle of 75° to 90° relative to the tire equatorial plane, and the invention tire is characterized in that at least one belt layer is made of organic fiber cords arranged substantially in parallel with the tire equatorial plane, and after vulcanization an average tension of the cords of said at least one belt layer at the central portion of the tread at an elongation upon the respective cords being more than 10% is higher than that of the cords of the belt layer at the side edge portion of the tread at substantially the same elongation upon the respective cords.

With the tire according to the invention, the belt is constituted by the organic fiber cords arranged substantially in parallel with the tire equatorial plane, and the average tension of the organic fiber cords at the central portion of the tread at a certain elongation is higher than that of the cords at side edge portion of the tread at substantially the same elongation after vulcanization. Therefore, the rigidity of the tire at the central portion of the tread is made relatively higher, while the rigidity of the tire at the side edge portion of the tread is relatively lower. As a result, the tire according to the invention can absorb protrusions and depressions and differences in level on roads during running on banks, while restraining radially outward protrusion of the tread, particularly, at the central portion thereof, when running at high speeds, in the same manner as in a tire having a belt layer formed by cords of high modulus of elasticity, such as aromatic polyamide fiber cords, spirally wound substantially in parallel with the tire equatorial plane.

These and other objects, features and advantages of the invention will be appreciated upon reading of the following description of the invention when taken in conjunction with the attached drawings, with the understanding that some modifications, variations and changes of the invention could be made by the skilled person in the art to which the invention pertains without departing from the spirit of the invention or the scope of claims attached hereto.

BRIEF DESCRIPTION OF THE DRAWINGS

For a better understanding of the invention, reference is made to the attached drawings, wherein:

FIG. 1 is a schematic sectional view illustrating one half of a tire as a preferred embodiment according to the invention;

FIG. 2 is a schematic sectional view illustrating one half of a tire as another embodiment according to the invention; and FIG. 3 is a graph illustrating the average tension in a plurality of cords at a central portion and a side edge portion of a tread of the tire according to the invention at substantially the same elongation.

DESCRIPTION OF THE PREFERRED EMBODIMENT

The present invention will be explained in more detail with reference to the specific embodiments shown in the drawings.

FIG. 1 illustrates a half of the vulcanized pneumatic radial tire for a two-wheeled vehicle, according to a preferred embodiment of the invention, on one side of the equatorial plane S of the tire as viewed in section. The tire 10 includes a carcass 12 composed of at least one carcass ply of organic fiber cords, for example, nylon or polyester. These organic fiber cords are arranged at a constant angle in a range of 75° to 90° with respect to the equatorial plane S. The carcass 12 serves to reinforce the tread 14 and the sidewalls 16 toroidally continuous therewith, and has opposite ends turned up radially outwardly in the tire rotating-axial direction around bead cores 18 embedded near radially inner ends of the opposite sidewalls 16.

Between the carcass 12 and the tread rubber forming the tread 14 is arranged a belt 20 having at least one belt layer composed of suitable organic fiber cords wound spirally but substantially parallel to the equatorial plane S. The organic fiber cords, which constitutes the belt layer and are arranged substantially in parallel to the equator of the tire, is characterized in that when a plurality of the organic fiber cords at the central portion 22 of the tread are subjected to elongation of 10% or more after the tire is formed under vulcanization, particularly, immediately thereafter, the average tension in the cords is higher than the average tension of a plurality of the organic fiber cords at the side edge portion 24 of the tread 14 at substantially the same elongation. In other words, the average tension of the cords at the central portion 22 of the tread 14 is on a higher elasticity side as compared with the cords at the side edge portion 24 of the tread 14. In the present invention, the term "average tension of the cords" means an average value of tensile loads required to be applied to the cords, respectively, to cause an equal elongation of the cords.

With the tire 10, if required, a rubber filler 26 or the like may be arranged adjacent the turn-up portion of the carcass 12 around a bead core 18, and grooves may be provided in the tread 14, the same with a known tire.

The reason why the average tension of a plurality of cords located at the central portion of the tread of the tire formed under vulcanization is made higher than that of the cords at the side edge portions of the tread when the cords are elongated at substantially the same level is that while radially outward protrusion of the central portion of the tread on running at high speeds is restrained, it is possible to maintain flexibility of the side edge portions of the tread so as to absorb external disturbances due to projections and depressions and differences in level on roads of banks, and stability of the tire is improved.

The tire 10 constructed as described above is produced in the following manner. A green tire is first formed, which includes a belt 20. The belt 20 is constituted by spirally winding a single organic fiber cord of nylon 6, nylon 66, polyester or the like around a crown portion of a carcass 12 in parallel with the tire equatorial plane S under substantially constant tension. The green tire is then vulcanized and formed in a mold whose internal configuration is designed so that the protrusion of the tire tread at the central portion is larger than that of the tread at the side edge portions after vulcanization.

In this case, it is preferable that a ratio of tire outer diameters, $(D-D_0)/D_0 \times 100$ is within a range of 1.5% to 5%, where $D_0$ is the diameter of the tire filled with an inner pressure of 0.3 kg/cm$^2$ and D is the diameter of the tire filled with an inner pressure of 2.9 kg/cm$^2$. When the ratio is within this range, the tire is given suitable rigidity in the circumferential direction.

The average tension of the organic fiber cords in the central portion 22 of the tread immediately after the tire is formed under vulcanization can be made greater than that of the cords at the side edge portion 24 of the tread under application of the same elongation upon the cords but still using a known mold for a green tire.

In order to array turns of the organic fiber cord substantially in parallel with the tire equatorial plane S, a single organic fiber cord is spirally wound substantially in parallel to the equatorial plane S of the tire, or alternatively a tape is formed by arranging a plurality of organic fiber cords adjacent and parallel to each other, and attached to around the crown portion of the carcass. This latter method can advantageously shorten the time required to arrange the belt in comparison with the case of spirally winding a single cord. The tire according to the invention is economically very advantageous in any method, because cords of, such as nylon 6, nylon 66 or the like can be used as the organic fiber cords to be spirally wound in parallel to the equatorial plane of the tire, which cords are less expensive than aromatic polyamide fibers used in the prior art tires.

In order to sufficiently prevent the tread from protruding on running at high speeds, the belt layer, which is composed of the organic fiber cords extending substantially in parallel with the tire equatorial plane S, preferably has a width which is 70% to 110% of the tread width W of the tire 10. However, the width of the belt layer is not limited to this range. The width of the spirally wound cord and the number of layers of the belt may of course be changed depending upon the specification of the tire.

In another embodiment shown in FIG. 2, in addition to a belt layer 20a composed of organic fiber cords spirally wound in parallel with the tire equatorial plane S, a further belt layer 20b is arranged between the belt layer 20a and a carcass 12. The further belt layer 20b is composed of cords arranged in one direction at an angle within a range of 45° to 90° relative to the tire equatorial plane S. Such belt layers 20b may be provided in plural plies. The belt layer 20a of this tire may also consist of a plurality of plies. With such a tire including the belt layer 20b in addition to the belt layer 20a, the rigidity of the tread surface of the tire can be improved so that freedom in design of tire is increased.

With the tire according to the invention, the belt is composed of the organic fiber cord arranged substantially in parallel with the tire equatorial plane, and the average tension A of the organic fiber cords at a given elongation at the central portion of the tread is higher than that B of the cords at side edge portions of the tread at substantially the same elongation as in A after vulcanization as shown in FIG. 3. As a result, the tire according to the invention can absorb protrusions and depressions and differences in level on roads during running on banks, while restraining radially outward protrusion of the tread, particularly, at the central portion thereof, when running at high speeds, in the same manner as in a tire having a belt layer formed by cords of high modulus of elasticity, such as aromatic polyamide fiber cords, spirally wound substantially in parallel with the tire equatorial plane.

Experiments

Tires having a tire size of MCR160/60 R17 were produced by way of example for comparative tests with respect to radially outward protrusion amount of tread at its central portion, straight run stability, cornering stability, and chattering on running at high speeds.

Invention tire

Invention tire had the construction shown in FIG. 1. The tire included a carcass and a belt. The carcass was composed of a carcass ply of cords made of nylon 66 having a denier of 1260d/2 and arranged at almost 90° relative to the tire equatorial plane, and the belt was composed of a belt layer of cords made of nylon 66 having a denier of 1890d/3 and spirally wound substantially in parallel with the tire equatorial plane S on the crown portion of the carcass over a width equivalent to 95% of the tread width W. When an average tension of five belt cords at the central portion of the tread at an elongation of 20% immediately after the tire was formed under vulcanization was indicated as 100 by index, an average tension of five belt cords at a side edge portion of the tread at the same elongation was indicated as 85 by index. The average tension was measured with respect to the cords of the belt taken out of the tire immediately after the tire was formed under vulcanization.

Comparative tire 1

Comparative tire 1 had a construction similar to that of the tire shown in FIG. 1 with exception that when an average tension of five belt cords at the central portion of the tread at an elongation of 20% immediately after the tire was formed under vulcanization was 85 as expressed by index, and an average tension of five belt cords at the side edge portion of the tread at the same elongation was also 85 as expressed by index.

Comparative tire 2

Comparative tire 2 had a construction similar to that of the tire shown in FIG. 1 with exception that when an average tension of five belt cords at the central portion of the tread at an elongation of 20% immediately after the tire way formed under vulcanization was 100 as expressed by index, and an average tension of five belt cords at side edge portion of the tread at the same elongation was also 100 as expressed by index.

A vehicle used for the comparison test was equipped with the following tire at a front wheel. The tire included a carcass composed of two carcass plies which were constituted by a cord made of nylon 66 having a denier of 1260d/2 and arranged at an angle of substantially 90° relative to the tire equatorial plane and which had end portions turned around bead cores axially from inside to outside of the tire. A belt layer of an aromatic polyamide fiber cord having a denier of 1500d/2 was uniformly arranged at an angle of substantially 24° relative to the tire equatorial plane over a width equivalent to about 95% of the tread width W. The cords of the respective carcass and belt layers intersected each other.

Methods of testing

Each of the test tires was fitted to a rear wheel of the sport type actual vehicle, which was run on a test course as a dried road. A radially outward protrusion of the tread of the rear tire was measured. Straight run stability, cornering stability, and chattering in cornering were examined by feeling. Results were evaluated by index. The larger the index value, the better is the performance.

The results are shown in Table 1.

TABLE 1

|  | Average tension in belt (shown by index) | | Protrusion of tread (300 km/h) | Straight run stability | Cornering stability | Chattering in cornering |
| --- | --- | --- | --- | --- | --- | --- |
|  | Central portion | Side edge portion |  |  |  |  |
| Invention Tire | 100 | 85 | 8 (mm) | 8 | 7 | 7 |
| Comparative tire 1 | 85 | 85 | 10 | 7 | 7 | 7 |
| Comparative tire 2 | 100 | 100 | 8 | 8 | 7 | 6 |

As can be seen from the Table 1, the tire including at least one belt layer compared of plural cords arranged substantially in parallel with the tire equatorial plane S according to the invention is able to restrain the radially outward protrusion of the tread and to improve the motion performance of the tire.

The invention can provide a pneumatic tire for a two-wheeled vehicle, which is improved in the motion performance on running at high speeds by increasing the rigidity at the required portion without increasing the rigidity of the tire as a whole.

What is claimed is:

1. A pneumatic two-wheeled vehicle tire, comprising; a carcass having opposite end portions turned up axially outwardly around a pair of bead cores spaced apart from each other in the direction of the tire-rotating axis, a tread and a pair of sidewalls reinforced by the carcass, a belt comprising at least one belt layer arranged between the tread and the carcass, said carcass having at least one carcass ply of organic fiber cords arranged at a constant angle of 75° to 90° relative to the tire equatorial plane, wherein said at least one belt layer is made of the same organic fiber cords arranged substantially in parallel with the tire equatorial plane, and an average tension of the cords of said at least one belt layer at the central portion of the tread is higher than that of the cords of the belt layer at the side edge portion of the tread at substantially the same elongation upon respective extracted cords, said average tension being determined following vulcanization of said two-wheeled vehicle tire by an elongation of the respective cords to a length greater than 10% of a length of said cords upon extraction from said tire.

2. The pneumatic tire as set forth in claim 1, wherein said belt layer has a width which is 70% to 110% of the tread width of the tire.

3. The pneumatic tire as set forth in claim 1, further comprising, between said carcass and said at least one belt layer, at least one additional belt layer made of cords arranged in the circumferential direction of the tire at an angle within a range of 45° to 90° to the tire equatorial plane.

4. The pneumatic tire as set forth in claim 1, wherein said at least one belt layer is made of a single organic cord spirally wound around the carcass under substantially constant tension in parallel with the tire equatorial plane, said at least one belt layer and carcass forming a portion of a green tire which is placed in a mold whose internal configuration is so designed that a radially outward protrusion of the tread of the tire at the central portion is larger than any radially outward protrusions of the tread at the side edge portions after vulcanization of said green tire to cause a difference in said average tension of cords in said central portion of the tread and said side edge portion thereof.

5. The pneumatic tire as set forth in claim 4, wherein a ratio of tire outer diameters, $(D-D_0)/D_0 \times 100$ is within a range of 1.5% to 5%, where $D_0$ is the diameter of the tire filled with an inner pressure of 0.3 kg/cm$^2$ and D is the diameter filled with an inner pressure of 2.9 kg/cm$^2$.

6. The pneumatic tire as set forth in claim 1, wherein said at least one belt layer is made of a single tape spirally wound around said carcass and formed by a plurality of organic cords arranged adjacent and parallel to each other, said green tire placed in a mold whose internal configuration is so controlled that a radially outward protrusion of the tread of the tire at the central portion is larger than any radially outward protrusions of the tread at the side edges after vulcanization of a green tire.

7. The pneumatic tire as set forth in claim 1, wherein said at least one belt layer is made of a single organic cord spirally wound around the carcass, wherein said average tension in the organic cord at the central portion of the tread is higher than that at the side edge portions of the tread as a result of molding during vulcanization of a green tire.

8. The pneumatic tire as set forth in claim 1 wherein said at least one belt layer is made of a single organic cord spirally wound around said carcass substantially in parallel with the tire equatorial plane, 9. The pneumatic tire as set forth in claim 1 wherein said at least one belt layer is made of a single tape spirally wound around said carcass substantially in parallel with the tire equatorial plane, said tape containing a plurality of rubberized cords.

* * * * *